United States Patent [19]
Barato

[11] 4,363,362
[45] Dec. 14, 1982

[54] MULTIPLE MACHINE FOR ROW-CROPPING WITH VERTICALLY OPERATING AXES

[76] Inventor: Paolo Barato, Via Madonna della Salute, 136, Padova, Italy

[21] Appl. No.: 128,192

[22] Filed: Mar. 7, 1980

[30] Foreign Application Priority Data

Mar. 7, 1979 [IT] Italy .............................. 41526 A/79

[51] Int. Cl.³ ...................... A01B 33/06; A01B 39/08
[52] U.S. Cl. .................................... 172/59; 172/117; 172/446; 172/47
[58] Field of Search .................. 172/49, 56, 49.5, 111, 172/57-60, 117

[56] References Cited

U.S. PATENT DOCUMENTS

| | | | |
|---|---|---|---|
| 1,063,079 | 5/1913 | Stevens | 172/59 X |
| 2,521,417 | 9/1950 | Sefcovic | 172/59 |
| 2,732,783 | 1/1956 | Murphy | 172/56 |
| 3,202,221 | 8/1965 | Monk | 172/60 |
| 3,367,425 | 2/1968 | Heeren | 172/59 |
| 3,667,551 | 6/1972 | Lely | 172/59 |
| 4,042,039 | 8/1977 | Lely | 172/59 |
| 4,072,196 | 2/1978 | Lely | 172/59 |
| 4,148,364 | 4/1979 | Scharmann | 172/59 |

FOREIGN PATENT DOCUMENTS

165788 10/1955 Australia .............................. 172/59
1045698 12/1958 Fed. Rep. of Germany ........ 172/59

*Primary Examiner*—Richard J. Johnson
*Attorney, Agent, or Firm*—Robert E. Stebens

[57] ABSTRACT

An earth tilling machine is provided having a structural frame on which a plurality of earth working units are mounted and operable to cultivate or till the soil. Each earth working unit includes an earth working head having a plurality of earth working rotors each mounted for revolution about a respective vertical axis with the axes of all rotors of a particular head disposed in a common vertical plane. The rotors of each head are mounted for revolution about a single vertical axis which is coaxial with the axis of revolution of one of the rotors of each particular head whereby the effective working width of the head can be varied from a minimum of the effective working diameter of a single rotor to a maximum of the cumulative effective working length of all rotors carried by that head. The several earth working units are mounted for selective displacement and positioning on the frame in a direction transverse to the normal direction of movement of the machine to permit adjustment of the total effective operating width of any two adjacently disposed units and the extent of overlapping operation through selective rotation of each working head to a desired angled position relative to the normal direction of movement of the machine.

11 Claims, 9 Drawing Figures

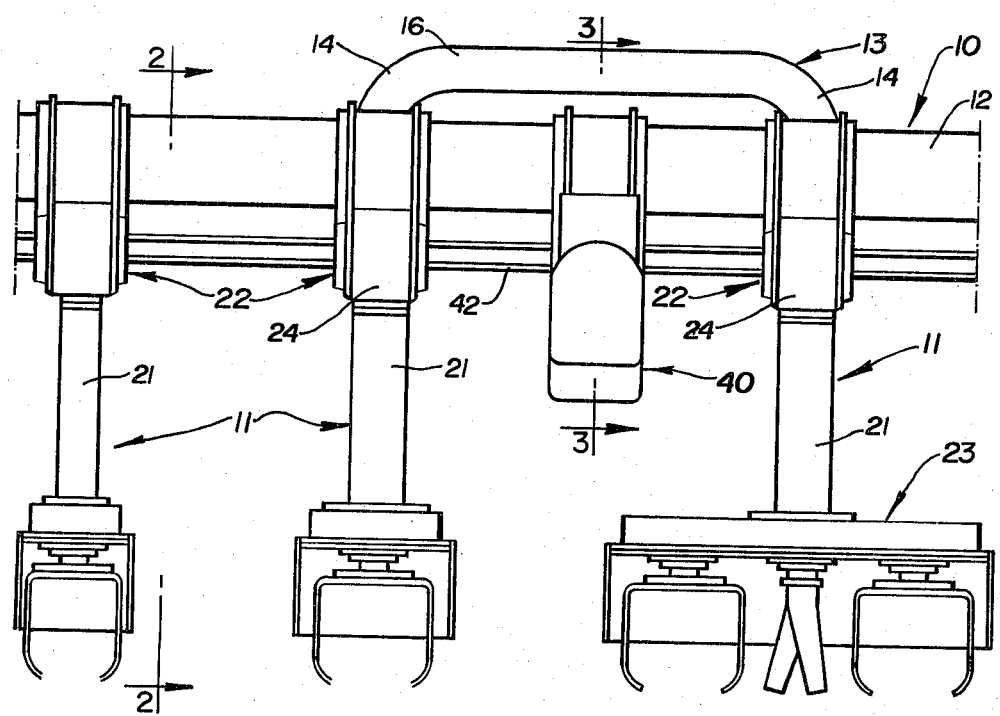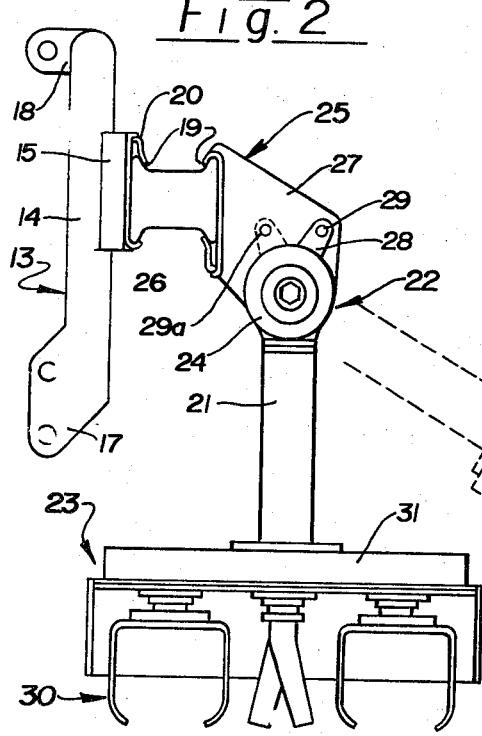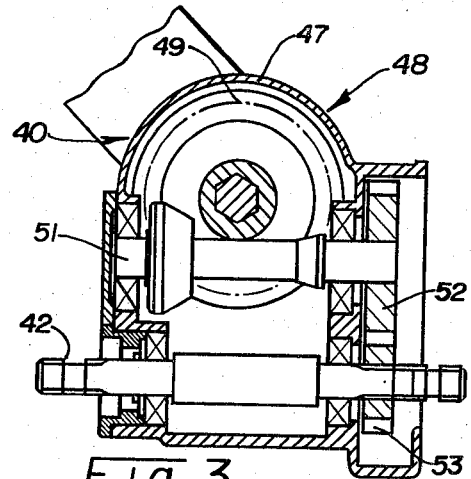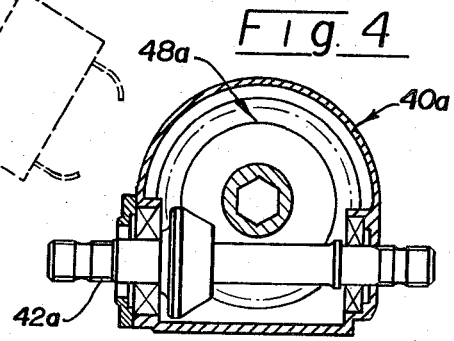

MULTIPLE MACHINE FOR ROW-CROPPING WITH VERTICALLY OPERATING AXES

FIELD OF THE INVENTION

This invention relates generally to agricultural machines for performing cultivation or tilling operations with respect to row crops. It relates more particularly to a machine having a multiplicity of operating heads or working elements which are selectively positionable on a transporting tractor vehicle so as to be disposed between adjacent rows of agricultural crops for effecting cultivation of the earth therebetween.

BACKGROUND OF THE INVENTION

Many agricultural crops that are planted in rows require cultivation during the growing season to not only aerate the soil but to periodically eradicate weeds and other undesirable plant materials that may be growing between the rows of crops. Various types of machines have been devised for such purposes and such machines include elements for working the land with those elements including blades, hoes and other structural elements. Many of these machines also have those working elements mounted on a trnsporting structural frame by mechanisms which enable those elements to be shifted in a direction transverse to the direction of travel of the machine so as to properly accommodate the desired row crop width and for appropriate positioning with respect to a particular row for more effective cultivation.

Cultivating or tilling machines designed for the stated purposes have also heretofore been developed which incorporate elements which are supported for rotation about horizontal axes with a predetermined number of such elements mounted in adjacent relationship on a single shaft for effecting cultivation of a strip having a width commensurate with the cumulative axial length of the several blade elements. However, such machines have not been found entirely satisfactory in that considerable difficulty is encountered and substantial time is utilized in shifting the elements to a desired position. Additionally, the elements mounted for revolution about a horizontal axis have not been found to be particularly effective in removal of weeds and additionally, they do not properly work the soil and tend to leave the earth at the lower levels of cultivation in a hard compacted layer thereby inhibiting drainage of water.

Other machines for cultivation and aerating of row crop land have been devised and which include earth working or tilling elements comprising vertically disposed blades that are mounted on a supporting structure for revolution about a vertically disposed axis. While such machines are more effective and efficient in the cultivating of the earth in row crops, the machines that have been devised allow the working of only a single strip of predetermined width at a particular time. These elements are generally incapable of adjustment for accommodating different width working strips and thus have found little utility for cultivation of row crops.

SUMMARY OF THE INVENTION

In accordance with this invention, a substantially improved earth tilling machine is provided for effecting cultivation of row crops. The tilling machine of this invention is provided with a multiplicity or plurality of earth working units having rotor-type tilling elements which are mounted on a supporting frame adapted to be carried and transported by an agricultural tractor. Each of the earth working heads is of a design enabling operation thereof to adapt the particular head to varying widths of strips to be cultivated or worked within the physical limitations of the construction of such an element. A plurality of the elements are mounted on the structural frame and cooperatively positionable to effect overlapping of the strips worked by the respective heads if such overlapping is desired.

Each of the earth working units or heads includes a vertically extending supporting strut adapted to be mounted at its upper end on the supporting and transporting frame and having an earth working head mounted on its lower end. Each of the earth working heads is provided with a plurality of rotors having vertically extending earth tilling elements that are supported for revolution about vertically extending and mutually parallel axes. In an illustrative embodiment, three sets of the earth elements are mounted on a supporting frame for unitary revolution of the group about a common vertical axis which is the axis of the supporting strut. This plurality of working heads disposed in a longitudinal array is thus capable of working a predetermined width or strip of ground. By selectively positioning the group of working heads through rotation about the vertical axis, the effective width of the ground that is worked can be selectively adjusted to meet a particular operating condition.

The several earth working units are mounted on a common supporting frame which permits the several units to be displaced with respect to each other in a direction transverse to the direction of travel of the machine to thus enable the machine to accommodate row crops of different widths. This relative transverse displacement of the several earth working units in combination with the ability of each unit to be selectively adjusted to work a desired width or strip of ground results in a particularly enhanced and useful machine and which is particularly advantageous in working of row crops.

Rotation of the several earth tilling elements carried by a particular earth working head is advantageously obtained through a power take-off drive of the transporting tractor. This power take-off drive includes a transmission that is carried on the supporting frame and is operative to transfer the rotational drive of the longitudinally extending axis to a transversely extending drive axle that is also carried on the support bar. A gear type transmission is provided to permit obtaining different rotational speeds to best accommodate particular working conditions. Additionally, the transmission mechanism is of a construction utilizing gears that advantageously permit the input drive to remain at a relatively low horizontal position as compared to the supporting frame that carries the several earth working units. The objective achieved by this construction is that the machine is better able to accommodate row crops of greater height without having to alter the desired horizontal drive from the power take-off of the tractor.

Also, in accordance with this invention, the several earth working units are of a construction which enables the respective earth working heads to vertically oscillate and thereby better accommodate undulations in the ground surface that may be encountered. This vertical oscillation is provided by forming the supporting struts as telescoping members interconnected by resilient spring-type devices. These elements are constructed to permit upward displacement of the respective earth working heads with the heads being biased in a downward direction by the springs and which springs resist forces which would tend to cause the heads to move upwardly.

The several earth working units are also preferably mounted on the supporting frame to enable swinging of the heads in a vertical plane about the transversely extending drive axle. This vertical swinging of the working units permits the working heads at the lower ends of the supporting struts to be swung upwardly to position where they would be out of engagement with the ground and suitable for transport.

These and other objects and advantages of this invention will be readily apparent from the following detailed description of illustrative embodiments thereof and the accompanying drawings.

DESCRIPTION OF THE DRAWING FIGURES

FIG. 1 is a rear elevational view of a portion of an earth tilling machine embodying this invention.

FIG. 2 is a vertical sectional view thereof taken along line 2—2 of FIG. 1.

FIG. 3 is a vertical sectional view of the power drive transmission taken along line 3—3 of FIG. 1.

FIG. 4 is a vertical sectional view similar to FIG. 3, but showing a modified power drive transmission.

DESCRIPTION OF THE ILLUSTRATIVE EMBODIMENTS

Figure 5:
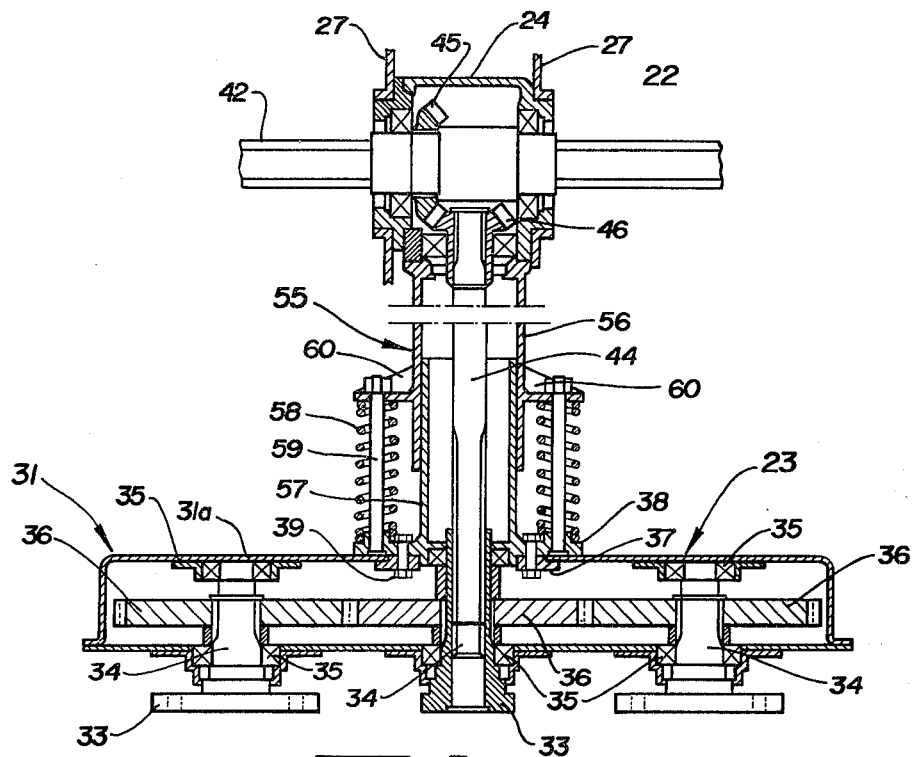
FIG. 5 is a medial vertical sectional view on an enlarged scale of one of the earth working units.

Having reference to the drawing figures and in particular to FIGS. 1 and 2, a basic embodiment of the invention is shown therein and is seen to comprise the basic elements of a mounting frame 10 and a plurality of earth working units 11. The structure as is shown in FIG. 1 will be noted as comprising only a portion of a complete machine that is adapted to be mounted on the rear of a transporting agricultural tractor. Although a fragmentary portion of such a machine is illustrated, it will be understood that the unit can be of greater length and include a greater number of earth working units 11 as may be desired for a particular size or capacity machine.

The mounting frame 10 includes an elongated structural beam 12 which is disposed to extend transversely across the rear of a tractor in a horizontal plane. Attachment and mounting of the structural beam 12 to the tractor is effected by a connector frame 13 which is adapted to interconnect with the coupling points of a three point type hitch with which agricultural tractors are commonly provided. Accordingly, this connector frame 13 is fabricated with a pair of vertical uprights 14 interconnected by a horizontal plate 15 and a horizontal cross bar 16 at their upper ends. Connector flanges 17 are formed at the bottom end of each of the vertical uprights 14 and a single connector bracket 18 is secured to the cross bar 16 intermediate the uprights 14. The connector flanges 17 and bracket 18 provide the mechanisms for interconnecting the structure with the three point hitch of a tractor.

The elongated structural beam 12 is secured to the rearwardly facing side of the horizontal plate 15 of the connector frame 13. In the illustrative embodiment, this beam 12 has an I-shaped cross-sectional configuration as can be best seen in FIG. 2 and is oriented with the flanges 19 projecting upwardly and downwardly. Mounting of the beam to the horizontal plate 15 is accomplished by means of a guideway 20 carried by the horizontal plate 15 and which receives the flanges of the structural beam 12.

Each of the earth working units 11 in a particular machine will preferably be of an identical construction with one embodiment thereof being shown in FIGS. 1 and 2. As can be best seen in those drawing figures, each earth working unit 11 includes a support strut 21 extending vertically when in an operating position and is provided with a mounting head 22 at its upper end and carrying an earth working head 23 at its lower end. A specific structural embodiment of a mounting head 22 is more fully disclosed in FIG. 5 to better illustrate the power drive mechanisms. This mounting head 22 is seen to include a structural housing 24 or gear case rotatably carried by a mounting bracket 25. The mounting bracket 25 includes a guideway 26 slideably positioned on an opposed set of flanges 19 formed with the structural beam 12 and is thus moveable longitudinally along that beam to a selected position. Rigidly secured to the guideway 26 are a pair of spaced apart mounting plates 27 that project relatively rearwardly from the beam and on which the housing 24 is journalled for revolution about a horizontal and transversely extending axis. The housing 24 is also provided with a position lock plate 28 that is secured to a respective mounting plate 27 by a lock pin 29 in either of the two illustrated positions shown in FIG. 2. In the full line position, as shown in FIG. 2, the earth working unit 11 will be positioned in a substantially vertical orientation where it is operative relative to the ground over which the machine is caused to travel. Removal of the lock pin 29 from interengagement between the lock plate and the mounting plate will permit the unit to be pivoted about its horizontal transverse axes to the illustrated broken line position and thus relatively inclined with respect to the ground surface. When swung to this position, the lock pin 29 is reinserted into a cooperating lock pin aperture 29a formed in the mounting plate.

Each of the earth working heads 23 provided at the bottom of a respective earth working unit includes a plurality of earth tilling rotors 30 which are carried by a structurally rigid casing 31 which may be provided with a protective depending skirt that is shown in section in each Figure for clarity of illustration. Each of the rotors 30 in the illustrative embodiment comprises a pair of vertically extending blade-like tilling elements 32 and which are mechanically interconnected in fixed relationship at their upper ends to a horizontal support 33. This horizontal support 33 may comprise an elongated plate and has an upwardly extending drive and support shaft 34 secured thereto. Each of these drive and support shafts 34 is journalled in a respective bearing assembly 35 carried by the casing 31. This casing 31 not only forms the structural support necessary for maintaining the several rotors in their operative position, but it forms a gear case for the three drive gears 36 with each gear being affixed to a respective drive and support shaft 34. The relative dimensions of the rotors and their respective tilling elements and associated drive gears are such that these gears are respectively intermeshed with the axes of the three drive and support shafts 34 being aligned in a common plane. With this arrangement, application of rotational power to the center shaft 34 will result in cooperative driving of the other two shafts and consequently cause counter rotation as between adjacent rotors. It will be noted that the center rotor is oriented with its tilling elements disposed in a plane that is perpendicular to the plane in which the tilling elements of the outer rotors are disposed. Preferably, the physical dimensioning is such that the circles of revolution of the sets of tilling elements will overlap and thereby effect complete tilling of the ground and avoid leaving ridges or unworked areas of the earth as between adjacent rotors. Referring to FIG. 1, it will be noted that the unit 11 at the extreme left has a smaller size rotor 30 than the next adjacent unit 11 to illustrate the fact that a machine may be constructed in various sizes.

In accordance with this invention, each earth working head 23 is mounted for revolution about the vertical extending axis of the support strut 21. To permit such rotational movement, a top panel 31a of the casing 31 is journalled on the bottom end of the support strut 21 and is provided with means for effecting frictional clamping of that housing in a desired position. This journalled mounting is effected by means of a clamping ring 37 which cooperates with an annular flange 38 formed with the support strut 21 at its bottom end. A plurality of bolts 39 extending through the clamping ring 37 and annular flange 38 may be provided to effect the clamping force for securing the upper panel 31a in frictionally gripped relationship between the ring and flange. The operational advantage of being able to revolve the relatively elongated earth working heads 23 is diagrammatically illustrated in FIG. 1. Comparing the two earth working units, it will be seen that they are oriented in a mutually perpendicular arrangement. Consequently, the width of the ground that is worked by the center unit will be only of a width essentially equivalent to the diametrical dimension A of the tilling elements 32 mounted on each of the respective three rotors, but it will be successively worked by the three rotors which are aligned with the longitudinal direction of travel of the machine. However, for the working head which is positioned as shown on the right side of FIG. 1, it will be seen that the effective width of the strip of ground that is now worked will be essentially equivalent to the dimension B which is for the maximum spacing of the outermost tilling elements 32 when they are aligned in a parallel position as is illustrated. It will be apparent that any intermediate rotational position will result in a proportional change in the effective width of a strip of ground that may be worked by any particular earth working unit 11.

As previously indicated, rotational driving of the rotors 30 is effected through obtaining of power from the transporting tractor on which the machine may be mounted. A tractor of this type is customarily provided with a power take-off comprising an output shaft which is not shown in the drawings as such a structure is well-known to those familiar with this art. Initially receiving the rotational power providing from the power take-off of the tractor is a geared transmission unit 40 which, in turn, is coupled to a transverse drive shaft 41. The transverse drive shaft 41 extends substantially parallel to the structural beam 12 and is adapted to be coupled in driving relationship with each of the earth working units 11. Accordingly, it will be noted that the transmission unit 40 is effective in translating the rotation of the longidutinally extending input drive shaft 42 to rotational movement about a horizontal transversely extending axis of an output drive coupling 43 of the transmission unit and the transverse drive shaft. The drive shaft 41 preferably has a hexagonal cross-sectional configuration to form a rotational drive engagement with the coupling 43 as well as with the several earth working units 11. Use of a hexagonal shaft or other spline configuration shaft provides a well-known means of transferring rotational movement while enabling interconnected elements to be displaced axially along the shaft to a desired or selected position.

Each of the earth working units 11 includes a vertical drive shaft 44 which extends coaxially through the tubular support strut 21. This drive shaft 44 is journalled in the strut by bearings at its upper and lower ends and has its lower end mechanically coupled with the center drive and support shaft 34 carrying one of the rotors 30. The upper end of the vertical drive shaft is coupled with the horizontal drive shaft 41 by a pair of bevel gears 45 and 46 with the one gear being affixed to the vertical drive shaft and the other gear mounted on the horizontal drive shaft to be driven thereby but capable of axial displacement along that shaft. These bevel gears will be noted as positioned within the housing 24. Having thus described the basic drive system, it will be clearly understood that rotational power applied to the input drive shaft 42 will ultimately cause revolution of the several rotors 30.

It is preferred that the transmission unit 40 be of the general type as illustrated in FIG. 3. This transmission unit includes a structurally rigid housing 47 provided with a mounting bracket 47a similar to the brackets 25 of the units 11 for mounting on the beam 11 and in which is mounted a gear reduction mechanism 48. The gear reduction mechanism 48 advantageously includes a large gear 49 which cooperates with a smaller gear 50 with these two gears being of a hypoid tooth configuration. Such a gear configuration enables the large gear 49 to be journalled in the housing 47 for rotation about a horizontal transversely extending axis and thus enable the drive coupling 43 positioned at the center thereof to engage with the drive shaft 41. The smaller gear 50 may then be mounted on its shaft 51 which is disposed below the center of the large gear and the transverse drive shaft 41 and extends longitudinally of the machine with respect to its direction of travel and is thus oriented in parallel relationship to the input drive shaft 42. The input drive shaft 42 and the small gear shaft 51 are disposed in parallel relationship and interconnected by a set of pinion gears 52 and 53 that are of different sizes to thus obtain a further change in relative rotational speeds as between those two shafts. The two shafts are journalled in the housing 47 and, if desired, other sets of gears that are of still different sizes may be optionally provided to replace the gears 52 and 53 to obtain different rotational speeds and thus better accommodate the operation of the machine to the operating characteristics of the transporting tractor and the earth working conditions. A particular advantage of the configuration for the transmission unit as shown in FIG. 3 is that this results in the transverse horizontal drive shaft 41 being relatively elevated with respect to the input drive shaft 42. As previously indicated, this is of advantage in that it enables the transverse frame and other associated components to be at a relatively higher elevation with respect to the input drive shaft, thereby permitting the machine to accommodate row crops of greater height. A specific advantage of this configuration and arrangement of components is that the input drive shaft is more directly aligned with the power take-off of most tractors.

An alternative transmission unit 40a is shown in FIG. 4. This alternative configuration does not include the speed reduction gearing mechanism provided by the gears 52 and 53 of the FIG. 3 embodiment, but is otherwise of essentially the same construction. The transmission unit does include the hypoid gear reduction mechanism 48a with the small gear 50 being mounted directly on the power take-off input drive shaft 42a.

In the FIGS. 1 and 2 embodiments, the support strut 21 of each earth working unit 11 comprises an elongated tube of fixed length. With such a construction, the earth working heads 23 will always remain at a fixed spaced relationship with respect to the horizontal drive shaft 41.

An alternative construction of the earth working units 11 is shown in FIG. 5 with respect to the support strut and drive engagement with the rotors. In this alternative embodiment, a support strut 55 is provided which permits vertical oscillatory movement of the earth working head 23 to thereby enable the mechanism to accommodate undulations in the surface of the ground traversed by the machine. The support strut 55 includes two tubular elements 56 and 57 which are telescopically interconnected to permit relative vertical displacement. The upper element 56 is secured or affixed to the housing 24 of the mounting head. Interconnecting the two tubular elements 56 and 57 is a spring biasing mechanism which in the illustrative embodiment of FIG. 5 comprises a plurality of helical coil springs 58 and restraining bolts 59. Each of the helical coil springs 58 is interposed between the upper surface of the annular flange 38 carried at the lower end of the bottom tubular element 57 and a pair of spring brackets 60 affixed to the upper tubular element 56 and projecting radially outward therefrom. The restraining bolts 59 engage with the flange 38 and brackets 60 and limit the axial extension of the two tubular elements 56 and 57 with the helical spring thus enabling those elements to telescope and thereby permit the earth working head 23 to move upwardly in accordance with the particular operating conditions.

Figure 6:
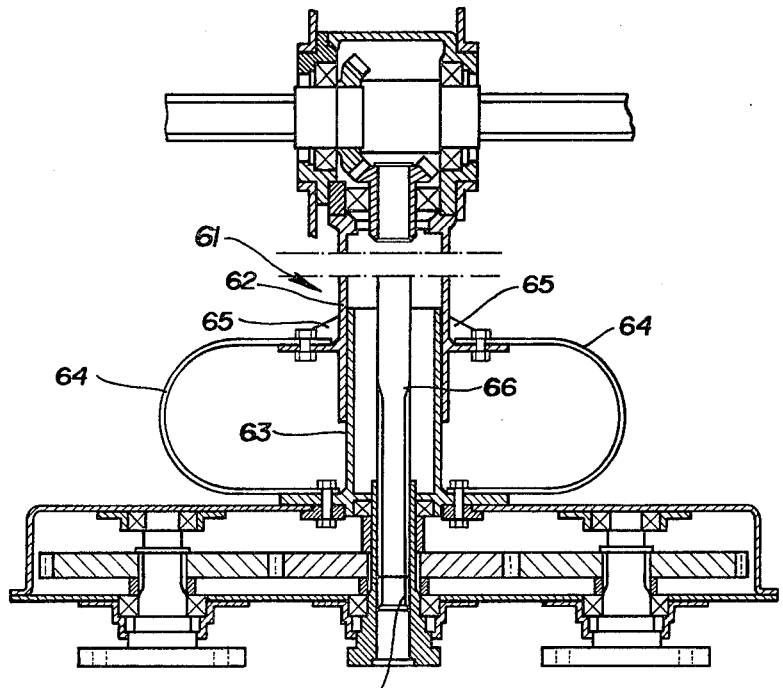
FIG. 6 is a medial vertical sectional view similar to FIG. 5, but showing a modified earth working unit.

An alternative construction for enabling axial displacement or vertical displacement of the earth working head is shown in FIG. 6. This alternative structure also includes a support strut 61 having the two telescopic tubular elements 62 and 63 arranged in the manner as described in the preceding paragraph. However, in this embodiment, the spring biasing is provided by a pair of U-shaped leaf springs 64. These springs are each interconnected at their opposite ends to the annular flange 38 formed at the bottom of the lower tubular element 63 and to respective spring brackets 65 affixed to the upper tubular element 62. This particular construction permits oscillatory movement of the earth working head in both upward and downward directions with respect to a centered or neutral position. The centered or neutral position is determined by the relative weight of the earth working head 23 and the biasing force of the springs 64.

In either of the two modified embodiments shown in FIGS. 5 and 6, the drive connection is modified to the extent necessary to accommodate the relative axial displacement of the earth working head with respect to the vertical axis of the support strut. This is accomplished by providing in each modification a vertical drive shaft 66 having a splined lower end portion adapted to slidingly interfit within a mating splined socket 67 coaxially formed in the interior of the center drive and support shaft 34. The drive and support shaft 34 is journalled in the casing 31 as previously described and is further secured to resist vertical displacement with respect to that casing. Thus, any oscillatory movement of the earth working head will merely result in the lower end of the vertical drive shaft 66 either projecting a greater distance into the spline socket 67 or be further withdrawn therefrom.

One of the operational functions previously described with the machine of this invention is that each of the several earth working units 11 may be selectively displaced along the structural beam 12 to a desired location for best effecting the cultivating function with respect to a row crop. This, as was described, was accomplished by merely displacing each of the earth working units 11 to the selected position through sliding of the respective mounting bracket 25 along that beam. Concurrent with such movement, the housing 24 was also capable of sliding axially with respect to the elongated drive shaft 41. When appropriately positioned, each unit could then be secured in a desired position and maintained at that position for further continued operation. This construction of the components and their attachment and interconnection enabled displacement of each of those units to relative positions that did not require uniform spacing as between all components. Thus, two adjacent units 11 could be positioned in relatively closely spaced relationship by revolving the earth working heads 23 to a particular angular orientation such that when the units were closely spaced there would be overlapping as between the strips of ground worked by each unit. Thus, it would be possible to readily position two of the earth working units 11 to operate between adjacent rows of a crop that is being cultivated.

Figure 7:
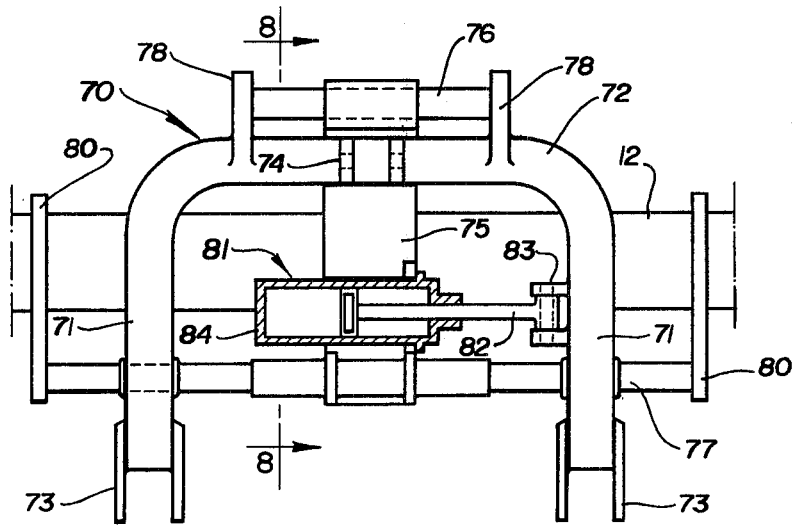
FIG. 7 is a front elevational view of a portion of an earth tilling machine embodying this invention and which includes a transverse displacement mechanism.
Figure 8:
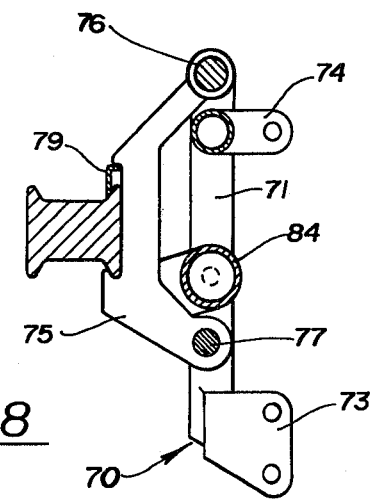
FIG. 8 is a vertical sectional view taken along line 8—8 of FIG. 7.

In addition to the selective adjustment that is obtainable by the mechanisms previously described, it is also advantageous to provide for translational movement of the structural beam 12. A mechanism for this purpose is illustrated in FIGS. 7 and 8 and includes a connector frame 70 similar to that described with respect to the FIGS. 1 and 2 embodiments and designed to be interconnected with a three point hitch associated with the transporting tractor. Thus, this connector frame 70 also includes a pair of vertical extending, spaced apart uprights 71 that are interconnected at their upper ends by a horizontal cross bar 72. The lower ends of each upright 71 are provided with connector flanges 73 while the cross bar 72 is provided at its midpoint with a connector bracket 74, each of which is designed for mechanical interconnection with the tractor's three point hitch at its connecting points. Supporting interconnection of the structural beam 12 to the connector frame 70 is effected by means of a C-shaped carrier frame 75 and respective upper and lower guide shafts 76 and 77. The upper guide shaft 76 is mounted on the horizontal cross bar 72 by a pair of vertically upstanding brackets 78 while the lower shaft 77 extends through journals formed in the lower end portions of the uprights 71. The two guide shafts 76 and 77 are thus seen to extend in a horizontal transverse direction with respect to the machine and its direction of travel and are thus parallel to the structural beam 12. The upper and lower ends of the C-shaped carrier frame 75 are slideably mounted on the respective upper and lower guide shafts 76 and 77 and are thus enabled to reciprocate in a transverse direction with respect to the direction of travel of the machine. A guideway is formed on a vertically extending portion of the carrier frame 75 and is adapted to receive the structural beam in relatively fixed relationship thereto. The lower guide shaft 75 extends transversely outward with respect to each upright 71 for a predetermined distance and is provided at its outer end with a stabilizing bracket 80. Each stabilizing bracket 80 is rigidly secured to the shaft 77 and projects upwardly and rearwardly and mechanically interconnects with the structural beam 12.

Powered displacement of the structural beam 12 with respect to the connector frame 70 is advantageously effected by means of a hydraulic ram 81. This hydraulic ram, as seen in FIGS. 7 and 8, comprises a cylinder and piston unit having a piston rod 82 which extends in a parallel direction with respect to the guide shafts 76 and 77 and has its outer end mechanically coupled to one of the uprights 71 by means of a pivot bracket assembly 83. The cylinder 84 is mounted in fixed relationship on the C-shaped carrier frame 75. This hydraulic ram 81 is of a double acting type and application of pressurized fluid to a selected end will be seen to cause transverse displacement of the cylinder and consequent transverse displacement of the carrier frame and the structural beam carried thereby. This transverse movement will thus be effective in positioning the several earth working units 11 at a desired position with respect to the transporting tractor and thus proper positioning relative to the row of crops. Depending upon the extent of such translational movement, it may be desirable to reposition the transmission unit 40 on the beam 12 to avoid having the tractor's power take-off shaft excessively angled. Hydraulic power for operation of the hydraulic ram 81 may be obtained from a suitable hydraulic system such as that which may be provided by the transporting tractor or the machine may be of a self-contained type having its own hydraulic unit including a pump that may be driven by connection with the transmission unit 40. For this purpose, the transmission unit 40 may be constructed as illustrated in FIG. 3 wherein the input drive shaft 42 extends toward the rear of the transmission casing and may be coupled with a hydraulic pump not shown as such systems are well known to those skilled in this particular field.

Figure 9:
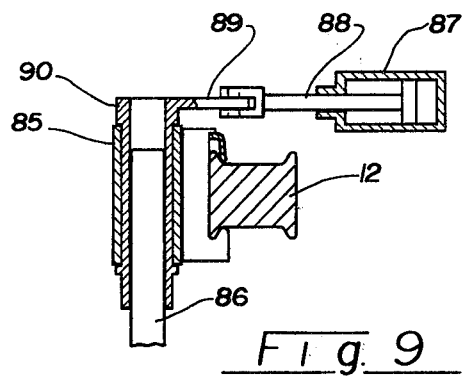
FIG. 9 is a fragmentary vertical sectional view of a modification of a transverse displaced mechanism for an embodiment of an earth tilling machine similar to that shown in FIG. 7.

An alternative structure for effecting translational movement of the structural beam 12 is illustrated in FIG. 9. This mechanism is adapted to be utilized with a machine configuration such as that which is illustrated in FIGS. 1 and 2. Secured to the structural beam 12 is a bearing assembly 85 in which a vertically extending shaft 86 is journalled. This shaft 86 is linked through levers (not shown in the drawings) to a couple of steering wheels. Operation of the mechanism is effected by a hydraulic ram 87 having a piston rod 88 connected to an operating lever 89 which, in turn, is interconnected with a drive extension of the vertically extending shaft 86. The hydraulic ram cylinder is affixed to the structural beam and its associated elements whereby extension or retraction of the ram piston rod 88 will result in rotation of the vertically extending shaft 86.

The embodiments of the machine illustrated and described herein enable the operator to set the machine up in any number of desired configurations to best adapt to a particular cultivating operation with respect to row crops. One of the initial set-up procedures is for the operator to determine the desired rotational speed of the rotors 30 and then with due consideration to the transporting speed of the tractor and the rotational speed of its power take-off shaft select the proper gears for positioning in the transmission unit 40. Next, the operator determines the operating conditions desired as with respect to each earth working unit 11 and its associated earth working head 23. For example, if it is desired to have two earth working units operating in between two adjacent rows, then it may be necessary to revolve the earth working heads 23 to appropriate angular positions in order that both heads may be accommodated between the two rows. This positioning of the rotor heads also enables the operator to select the extent of overlapped operation as between the two adjacent units. Once the arrangement and spacing of the respective earth working units 11 is set along with the rotational position of the respective earth working heads 23, then the structural beam 12 may be relatively positioned on the connector frame to place those units at a proper position with respect to the wheels of the transporting tractor in the event that asymmetric operating conditions are appropriate for a particular cultivating operation. With the embodiments such as those illustrated in FIGS. 7, 8 and 9, translational movement of the structural beam 12 may be readily effected. However, with the construction such as that shown with the embodiment illustrated in FIGS. 1 and 2, the beam 12 may also be manually displaced in its guideway as may be appropriate for a particular situation.

It will be readily apparent from the foregoing detailed description of the illustrative embodiments pf this invention and the accompanying drawings that a particularly novel and extremely useful earth tilling machine is provided for the cultivation of row crops and aeration of the earth. The machine has extreme versatility in its numerous adjustments so as to adapt itself to any particular desired and advantageous operating configuration with respect to row crops. Providing of the sets of earth tilling rotors which are rotatable about common axes located in a single plane and having that plane rotatable enables obtaining of various widths of cultivation and various extents of overlap as between adjacently disposed earth working units.

What is claimed is:
1. An earth tilling machine comprising
an elongated frame extending in a direction transverse to the normal direction of movement of the machine,
a plurality of earthworking units carried on said frame and selectively movable thereon in a direction transverse to the direction of travel of the machine, each of said earthworking units including a vertically extending support strut mounted on said frame and projecting a distance laterally with respect to said frame, and an earthworking head carried on said support strut in relatively remote relationship to said frame, said earthworking head including a plurality of earth tilling rotors with each rotor supported for revolution about a respective vertically extending axis with all rotor axes of a respective head being mutually parallel, said plurality of rotors of each earthworking head disposed in a generally longitudinally extending alignment whereby the rotors of each head have a cumulative effective length greater than the effective working diameter of a single rotor, each rotor of each earthworking head provided with a plurality of angularly spaced apart, vertically extending tilling elements positioned radially outward with respect to the rotor's axis of revolution with the rotors relatively oriented with respect to each other such that the circle of revolution of the tilling elements of a rotor overlaps the circle of revolution of a next adjacent rotor's tilling elements, said earthworking head being mounted on said strut for revolution about a vertical axis disposed parallel to the axis of said rotors whereby said rotors may be revolved in a horizontal plane to a predetermined position relative to said frame, and power transmission means operatively coupled with said rotors for effecting revolution thereof.

2. An earth tilling machine according to claim 1 wherein said rotors are supported with all vertical axes thereof disposed in a common plane.

3. An earth tilling machine according to claim 1 or 2 wherein said earth working head vertical axis of revolution is coaxial with the vertical axis of revolution of one of said rotors.

4. An earth tilling machine according to claim 3 wherein said earth working head includes at least three rotors disposed with one rotor intermediate the other two rotors with the axis of revolution of said earth working head coaxial with the axis of revolution of said intermediate rotor.

5. An earth tilling machine according to claim 4 wherein the axis of revolution of said earth working head is parallel to said support strut.

6. An earth tilling machine according to claim 1 wherein said rotors on an earth working head are all disposed with their axes of revolution disposed in a common plane whereby the working head has an effective working width no less than the effective working diameter of a single rotor.

7. An earth tilling machine according to claim 1 wherein said plurality of rotors of each earth working head are mechanically coupled to be concurrently driven by a driving connection to one of said rotors.

8. An earth tilling machine according to claim 1 or 7 wherein said power transmission means includes an elongated, transverse drive shaft extending in a direction transverse to the normal direction of movement of the machine, means connected with said transverse drive shaft for effecting revolution thereof, and a driving connection between said transverse drive shaft and the rotors of each of said earth working heads for effecting revolution of the rotors.

9. An earth tilling machine according to claim 8 wherein said power transmission means includes a change speed gear transmission having an input drive shaft extending in a direction parallel to the normal direction of travel of the machine and an output gear coupled with said transverse drive shaft in driving relationship thereto.

10. An earth tilling machine according to claim 1 wherein said elongated frame includes an elongated beam on which each of said earth working units are mounted and a connector frame adapted for mounting on a machine transporting device, said elongated beam mounted on said carrier frame for movement thereon in a direction transverse to the normal direction of travel of the machine.

11. An earth tilling machine comprising
an elongated frame extending in a direction transverse to the normal direction of movement of the machine, said elongated frame includes an elongated beam on which each of said earthworking units are mounted and a connector frame adapted for mounting on a maching transporting device, said elongated beam mounted on said connector frame for movement thereon in a direction transverse to the normal direction of travel of the machine,
a plurality of earthworking units carried on said frame and selectively movable thereon in a direction transverse to the direction of travel of the machine, each of said earthworking units including a vertically extending support strut mounted on said frame and projecting a distance laterally with respect to said frame, and an earthworking head carried on said support strut in relatively remote relationship to said frame, said earthworking head including a plurality of earth tilling rotors with each rotor supported for revolution about a respective vertically extending axis with all rotor axes of a respective head being mutually parallel, said earthworking head being mounted on said strut for revolution about a vertical axis disposed parallel to the axis of said rotors whereby said rotors may be revolved in a horizontal plane to a predetermined position relative to said frame, and
power transmission means operatively coupled with said rotors for effecting revolution thereof.

* * * * *